ial having small amounts of cobalt, copper, iron, manganese and zinc salts, uniformly distributed throughout said material.

2,973,265
ANIMAL FEED SUPPLEMENT

Marvin B. Gillis, Glenview, Ill., assignor to International Minerals & Chemical Corporation, a corporation of New York No Drawing. Filed Apr. 29, 1957, Ser. No. 655,542

6 Claims. (Cl. 99—2)

This invention relates to an improved supplement for animal feeds and a method of preparing it. More particularly, the invention relates to a supplement for livestock and poultry feeds comprised of a calcium phosphate material having small amounts of cobalt, copper, iron, manganese and zinc salts, uniformly distributed throughout said material.

Phosphatic materials, particularly calcium orthophosphates have been used heretofore as feed supplements in order to promote the healthy growth of livestock and poultry. It has also been known that certain other mineral elements in small amounts are necessary for the healthy growth of livestock and poultry. For example, compounds of iron and copper promote hemoglobin regeneration when fed to livestock and poultry in small amounts. Manganese in small amounts is essential to the healthy growth of poultry. Cobalt in small amounts is essential to the health and growth of cattle. Small amounts of zinc are fed to swine in order to minimize the possibility of swine developing parakaratosis, a condition characterized by skin disorders and general debilitation.

The term "trace elements" used throughout the specification refers to those elements which are nutritionally essential in small amounts in the diets of animals, and includes the elements cobalt, copper, iron, manganese and zinc.

Heretofore, solid compounds of the trace elements were mixed in small amounts with the other feedstuffs or mineral mixtures and used in the diet of livestock and poultry. Since a relatively small amount of these compounds was used with respect to the amount of other feedstuffs, it was difficult to obtain a uniform distribution of the trace elements throughout the feed by mechanical mixing of the solids. As a result, there was no assurance that all of the livestock or poultry would receive the desired amounts of these elements in their diet. Considerable labor and inconvenience were also experienced in mixing the several solid compounds with the other feedstuffs or mineral mixtures.

It is a primary object of the present invention to overcome the disadvantages inherent in previously known methods of preparing an animal feed supplement containing compounds of trace elements.

It is another object of the present invention to provide an improved solid livestock and poultry feed supplement.

Another object of the invention is to provide a solid calcium orthophosphate feed supplement containing compounds of trace elements uniformly distributed throughout the solid.

Still another object is to provide an improved method of preparing a livestock and poultry feed supplement comprised of a solid calcium orthophosphate and trace elements uniformly distributed therein.

These and other objects and advantages of this invention will be readily apparent from the following detailed description.

In the preparation of the novel livestock and poultry feed supplement, small amounts of compounds of cobalt, copper, iron, manganese and zinc are reacted with an aqueous solution of phosphoric acid. A calcium compound is added to the solution to precipitate a solid calcium orthophosphate material having compounds of cobalt, copper, iron, manganese and zinc uniformly distributed throughout the solid. If desired, a portion of the calcium compound may be replaced by a material selected from the group consisting of ammonia, ammonium compounds, sodium compounds, and potassium compounds.

An aqueous solution of phosphoric acid having an $H_3PO_4$ concentration of between about 20% and about 85% and preferably between about 40% and about 65% by weight is used as a source of phosphate in the feed supplement, although other concentrations may be used. It is desirable that the phosphoric acid contain less than about one-hundredth part by weight of fluorine per part of elemental phosphorus since a fluorine content in excess of this amount may have a toxic effect when fed to livestock and poultry. Phosphoric acid produced by the well-known "furnace method" which has been adjusted to the above-mentioned concentration range may be used. "Wet process" phosphoric acid may also be used provided the necessary steps are taken to reduce the fluorine content to a point below the above-mentioned toxic level, and provided the $H_3PO_4$ concentration is adjusted to the above-mentioned concentration range.

Compounds of cobalt, copper, iron, manganese and zinc are reacted with an aqueous solution of phosphoric acid while agitating the acid by suitable means. It is preferred to use compounds of the trace elements which are readily soluble in phosphoric acid, such as the sulfates or chlorides of trace elements. However, compounds which are partially soluble in phosphoric acid may also be used provided they are added to the acid in finely divided form, for example, having a particle size less than about 200 mesh.

Sufficient cobalt compound is added to the acid to provide between about 10 and about 1000, and preferably between about 25 and about 100, parts of cobalt per million parts of phosphorus in the acid solution. Preferably, cobalt is added as cobaltous chloride hexahydrate $$(CoCl_2 \cdot 6H_2O)$$
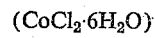

Other cobalt compounds which may be used are cobalt citrate, cobalt nitrate, cobalt phosphate octahydrate, and cobalt sulfate.

A copper compound is added to the acid to provide between about 1000 and about 15,000, and preferably between about 2000 and about 10,000, parts of copper per million parts of phosphorus in the acid solution. Preferably, copper is added as cupric sulfate pentahydrate $$(CuSO_4 \cdot 5H_2O)$$
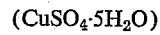

Other copper compounds which may be used include cupric chloride and cupric sulfate.

Sufficient iron compound is added to the acid to provide between about 1000 and about 50,000, and preferably between about 10,000 and about 50,000, parts of iron per million parts of phosphorus in the acid solution. Preferably, iron is added as ferrous sulfate heptahydrate $$(FeSO_4 \cdot 7H_2O)$$
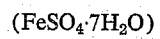

Other iron compounds which may be used are ferrous acetate, ferrous carbonate, ferrous chloride, and ferrous oxide.

A manganese compound is added to the acid to provide between about 500 and about 30,000, and preferably between about 5000 and about 30,000, parts of manganese per million parts of phosphorus in the acid solution. Preferably, manganese is added as the manganous sulfate hydrate ($MnSO_4 \cdot H_2O$). Other manganese compounds which may be used are manganous acetate, manganous carbonate, manganese chloride and manganous orthophosphate.

Sufficient zinc compound is added to the acid to provide between about 1000 and about 50,000, and preferably between about 10,000 and about 40,000, parts of zinc per million parts of phosphorus in the acid solution. Preferably, zinc is added as zinc chloride ($ZnCl_2$). Other zinc compounds which may be used are zinc acetate, zinc oxide and zinc sulfate.

Compounds of trace elements in the above-mentioned amounts are preferably added in finely divided solid form to the aqueous solution of phosphoric acid. The mixture of acid and trace element compounds is agitated by a suitable means such as a mechanical stirrer to aid in solubilizing the solids and to produce a substantially homogeneous solution. A satisfactory rate of solubility may be obtained when the temperature of the slurry is maintained between about atmospheric temperature and about 60° C. Trace elements may be added to the acid as aqueous solutions if desired, but the total water content of the resulting solution should be maintained at less than about 65% by weight in order to minimize the load on the dryer in the subsequent drying step.

After the compounds of trace elements are reacted with the phosphoric acid solution, a calcium compound is added to react with the free phosphoric acid remaining in solution after the trace element reaction. When a calcium compound is added to the solution, solid calcium orthophosphate impregnated with orthophosphates of trace elements is precipitated. Preferably, calcium carbonate is used to react with the phosphoric acid solution, but other compounds such as calcium oxide or calcium hydroxide may also be used. A calcium containing compound is added to the acid in an amount sufficient to provide a $CaO/P_2O_5$ mole ratio of between about 0.9 and about 3.0 and preferably between about 1.5 and about 2.5:1. It is preferred that the particle size of the calcium compound be less than about 100 mesh in order that a rapid reaction of the calcium compound with the solution may be obtained. The solution is agitated by suitable means while introducing the calcium compound in order to obtain substantially complete reaction between the calcium and phosphate.

If desired, a portion of the calcium compound may be replaced by a material selected from the group consisting of ammonia, ammonium compounds, potassium compounds, and sodium compounds. In this instance, it is preferred that sufficient calcium compound be added to react with at least half of the moles of phosphoric acid present in the solution to form a calcium orthophosphate. The remainder of the phosphoric acid forms orthophosphates with the trace elements and a material selected from the group consisting of ammonia, potassium and sodium. On a mole basis, at least half of the phosphoric acid reacts with the calcium compound to form a calcium orthophosphate. A minor portion of the phosphoric acid on a mole basis reacts to form an orthophosphate of a material selected from the group consisting of ammonia, sodium and potassium. Suitable compounds which may be used to replace a portion of calcium compound in the reaction include ammonia in gaseous form or as an aqueous solution, ammonium chloride, ammonium carbonate, ammonium sulfate, potassium hydroxide, potassium chloride, potassium sulfate, potassium carbonate, sodium hydroxide, sodium carbonate, sodium chloride and sodium sulfate.

After the reatcion is substantially complete, it is preferred to heat the slurry containing solid orthophosphate to a temperature between about 100° C. and about 150° C. to evaporate substantially all of the excess water and produce a dry solid material. The amount of time necessary to accomplish drying of the slurry will depend upon the drying temperature and the solids concentration of the slurry. Slurries having a solids concentration greater than about 75% by weight may be dried in between about ½ to about 4 hours. However, shorter or longer drying periods may be used, depending upon the solids concentration and the drying temperature. When this drying procedure is used, substantially all of the ingredients, with the exception of water, may be recovered in the novel feed supplement.

When dilute phosphoric acid solutions are used to prepare the novel feed supplement, it may be desirable to separate the solid orthophosphate material from the solution by a suitable means such as by filtration. The solid orthophosphate material may be heated to a temperature between about 100° and about 150° C. until substantially moisture free. When this procedure is followed a substantial portion of the phosphate and trace elements may remain in solution and are separated from the solid orthophosphate material. This solution may either be discarded, or at least a portion of it may be used to dilute concentrated phosphoric acid for use in preparation of the novel feed supplement. After drying the solid, it may be comminuted to a particle size of about −35 +100 mesh, but coarser or finer material may be produced if desired.

In most cases, the amount of the instant novel feed supplement which it is desirable to add to an otherwise complete ration for livestock in order to maintain health and stimulate growth, lies between about 0.5 and about 2.5% by weight of the total dry ration. However, in cases of severe nutritional deficiency it may be desirable to add considerably more to the diet in the form of the instant novel feed supplement. In the latter case, it may be desirable also to admix the phosphatic feed supplement with common salt or other condiment or flavoring material such as molasses, and allow the affected animals to consume the material ad libitum until the nutritional deficiency has been corrected.

It will be recognized by those skilled in the art that the composition of the novel feed supplement may be varied without departing from the spirit of the invention. For example, if the feed supplement is to be used only in a poultry diet, cobalt and zinc compounds need not be used in the preparation of the supplement. If the feed supplement is to be used only in a cattle diet, zinc compounds may not need to be used. If the supplement is to be used only in a swine diet, manganese compounds need not be used.

As illustrative of the character of the instant invention but not intending to be limited thereby, the following examples are described. All parts and percentages are by weight unless otherwise specified.

EXAMPLE I

About 1000 parts of an aqueous solution of phosphoric acid containing about 50% $H_3PO_4$, was placed in a suitable container and agitated by a mechanical stirrer. Compounds of trace elements in solid form were added to the phosphoric acid in the following amounts:

| Compound: | Parts |
|---|---|
| $CoCl_2 \cdot 6H_2O$ | 0.56 |
| $CuSO_4 \cdot 5H_2O$ | 0.54 |
| $FeSO_4 \cdot 7H_2O$ | 6.80 |
| $MnSO_4 \cdot H_2O$ | 7.93 |
| $ZnCl_2$ | 7.70 |

After dissolution of the solids, about 510 parts of calcium carbonate were slowly added to the solution. The viscous slurry which was produced was placed in a ceramic tray and dried in an oven at a temperature of about 110° C. for a period of about 72 hours. About 721 parts of solid product were obtained. This material was comminuted to a product size less than about 50 mesh. Presented below is a chemical analysis of the feed supplement.

| Element: | Percent by weight |
|---|---|
| P | 22.7 |
| Ca | 29.5 |
| Co | 0.019 |
| Cu | 0.019 |
| Fe | 0.190 |
| Mn | 0.358 |
| Zn | 0.499 |

EXAMPLE II

Example I is repeated with the exception that the compounds of trace elements are added to the phosphoric acid as follows:

| Compound: | Parts |
|---|---|
| $CoCl_2 \cdot 6H_2O$ | 0.06 |
| $CuSO_4 \cdot 5H_2O$ | 2.7 |
| $FeSO_4 \cdot 7H_2O$ | 19.0 |
| $MnSO_4 \cdot H_2O$ | 7.93 |
| $ZnCl_2$ | 7.70 |

Approximate chemical analysis of the feed supplement is as follows:

| Element: | Percent by weight |
|---|---|
| P | 22.1 |
| Ca | 27.1 |
| Co | 0.002 |
| Cu | 0.096 |
| Fe | 0.53 |
| Mn | 0.355 |
| Zn | 0.515 |

EXAMPLE III

In order to show the effectiveness of the feed supplement prepared in Example I, the following tests were carried out:

Sixteen rats which were low in blood hemoglobin, were divided into two groups of eight rats each, and designated as groups I and II, respectively. The rats were fed a diet comprised of dried milk and a feed supplement. Group I was fed a diet comprised of dried milk and 2% dicalcium phosphate. Group II was fed a milk diet supplemented with 2% of the material prepared in Example I. The rats were maintained on these diets for a period of 20 days. Table I shows the rate of growth of the rats in each group during this period.

Table I

| Group | Diet | Variation of Weight of Rats in Grams With Time, in Days | | | |
|---|---|---|---|---|---|
| | | 0 Days | 5 Days | 12 Days | 20 Days |
| I | Dried Milk+2% Dicalcium Phosphate, Grams. | 122 | 133 | 133 | 137 |
| II | 2% of Feed Supplement Prepared in Example I, Grams. | 128 | 157 | 181 | 212 |

Table II shows the change in hemoglobin content in the blood of the rats during the test period.

Table II

| Group | Variation of Hemoglobin, gms./100 ml. of Blood, With Time, Days | | | |
|---|---|---|---|---|
| | 0 Days | 5 Days | 12 Days | 20 Days |
| I, gms./100 ml | 6.16 | 3.40 | 3.32 | 2.60 |
| II, gms./100 ml | 6.40 | 6.31 | 8.38 | 11.14 |

It can be seen that when the novel feed supplement is fed to rats, substantially better results are obtained than when rats are fed a diet which does not contain trace elements.

Having thus fully described the invention, what is desired to be secured by Letters Patent is:

1. A method of preparing a calcium phosphate-containing livestock and poultry feed supplement which comprises the steps of reacting an aqueous phosphoric acid solution with compounds of cobalt, copper, iron, manganese and zinc, said acid containing less than about one part of fluorine per 100 parts of phosphorus, said cobalt compound being added in an amount to provide between about 10 and about 1,000 parts of cobalt, said copper compound being added in an amount to provide between about 1,000 and about 15,000 parts of copper, said iron compound being added in an amount to provide between about 1,000 and about 50,000 parts of iron, said manganese compound being added in an amount to provide between about 500 and about 30,000 parts of manganese, and said zinc compound being added in an amount to provide between about 1,000 and about 50,000 parts of zinc per million parts of phosphorus in said phosphoric acid solution, reacting a calcium compound with the free phosphoric acid remaining in solution after reaction with the compounds of cobalt, copper, iron, manganese and zinc, whereby a slurry is formed by the precipitation of a solid calcium orthophosphate material, said material having compounds of cobalt, copper, iron, manganese and zinc distributed throughout the solid, and recovering said solid orthophosphate material.

2. The method of claim 1 wherein said slurry formed by precipitation of calcium orthophosphate material is heated to dryness and the resulting solid material is comminuted.

3. The method of claim 1 wherein the concentration of phosphoric acid is between about 20 and about 85% $H_3PO_4$ by weight.

4. The method of claim 1 wherein a calcium compound is added in an amount to provide a $CaO/P_2O_5$ mole ratio of between about 0.9 and about 3.0:1.

5. The method of claim 1 wherein the calcium compound is calcium carbonate.

6. A method of preparing a calcium phosphate-containing livestock and poultry feed supplement which comprises the steps of reacting an aqueous phosphoric acid solution with compounds of cobalt, copper, iron, manganese and zinc, said acid containing less than about one part of fluorine per 100 parts of phosphorus, said cobalt compound being added in an amount to provide between about 10 and about 1,000 parts of cobalt, said copper compound being added in an amount to provide between about 1,000 and about 15,000 parts of copper, said iron compound being added in an amount to provide between about 1,000 and about 50,000 parts of iron, said manganese compound being added in an amount to provide between about 500 and about 30,000 parts of manganese, and said zinc compound being added in an amount to provide between about 1,000 and about 50,000 parts of zinc per million parts of phosphorus in the phosphoric acid solution, adding a calcium compound in an amount sufficient to react with at least half of the phosphoric acid originally present in the solution, adding a material selected from the group consisting of ammonia, ammonium compounds, sodium compounds, and potassium compounds in an amount sufficient to react with the free phosphoric acid remaining in solution, precipitating a solid calcium orthophosphate material in which compounds of cobalt, copper, iron, manganese and zinc are distributed throughout said solid, heating to dryness the slurry formed by precipitating said solid, and comminuting the dry solid orthophosphate material.

References Cited in the file of this patent

UNITED STATES PATENTS

| 2,005,617 | Genz | June 18, 1935 |
| 2,095,993 | MacIntire | Oct. 19, 1937 |
| 2,689,794 | Jackson | Sept. 21, 1954 |